Jan. 1, 1929.
W. SCHEPPMANN
1,697,328
OSCILLATION CIRCUIT
Original Filed Aug. 31, 1921
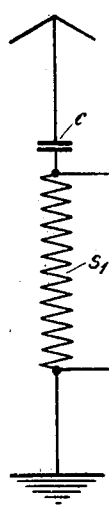
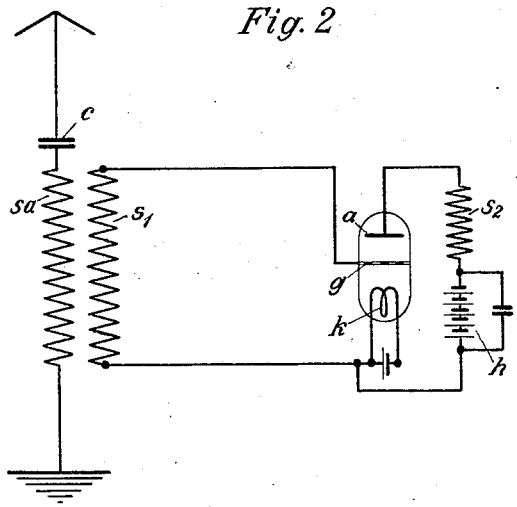
Inventor
Wilhelm Scheppmann
by
attorney Patented Jan. 1, 1929.

1,697,328

UNITED STATES PATENT OFFICE.

WILHELM SCHEPPMANN, OF BERLIN-TEMPELHOF, GERMANY, ASSIGNOR TO C. LORENZ AKTIENGESELLSCHAFT, OF BERLIN-TEMPELHOF, GERMANY.

OSCILLATION CIRCUIT.

Original application filed August 31, 1921, Serial No. 497,316, Patent No. 1,588,813, dated June 15, 1926, and in Germany November 29, 1917. Divided and this application filed May 13, 1926. Serial No. 108,831.

(GRANTED UNDER THE PROVISIONS OF THE ACT OF MARCH 3, 1921, 41 STAT. L., 1313.)

My invention relates broadly to oscillation circuits and more particularly to an electron tube circuit having an arrangement of parts for the generation of sustained oscillations.

This application the invention for which is disclosed and claimed in the German application L45,896, filed November 29, 1917 and which has matured into German Patent 416,814 issued July 27, 1925, is a division of my application Serial No. 497,316, filed August 31, 1921, for oscillation circuits which has matured into Patent 1,588,813.

It has become known in the use of vacuum tubes with an auxiliary electrode as generators for the production of undamped electric oscillations, that the auxiliary electrode as well as the anode must be coupled with an oscillation circuit in order on the one hand, to transmit to the oscillation circuit the energy produced by the tube and, on the other hand, to conduct again to the tube, part of the oscillating energy which exists in the oscillation circuit to excite the tube for producing undamped oscillations, in other words to use a so-called "return coupling". Generally in this practice, the two self-inductances for the connection of the auxiliary electrode and of the anode with the filament, are both inserted in one oscillation circuit. These methods suffer from the inconvenience that the energy which is returned to the tube for the purpose of control must not exceed limits if the best efficiency has to be ensured. These arrangements can, therefore, not be used for a great wave range and for different degrees of energy without an alteration of the return coupling of the tube with the oscillation circuit. This is particularly undesirable, as the alteration has often to be made by relatively moving coupled coils whose position is determined by the condition that they couple themselves in a degree determined by their relative positions.

A further inconvenience is caused by the coupled coils as comparatively a large amount of metallic material is thus embodied into the field of self-inductance of the oscillation circuit, so that an unnecessary damping of this oscillation circuit and unnecessary losses in the same are caused which is noxious, especially when the tube is used for receiving purposes.

These inconveniences are avoided, according to this invention, by an arrangement of the two self-inductances, of which one is connected between the auxiliary electrode and the cathode, and the other between the anode and the cathode, or forms a part of this oscillation circuit. Consequently the two self-inductances without any mutual magnetic coupling are connected only through the intermediary of the anode and of the auxiliary electrode (grid) in contradistinction to the arrangement mentioned above in which the two self-inductances are enclosed in one closed common circuit. The following result is obtained from the insertion of only one of the two self-inductances in the primary oscillation circuit or from the coupling of this one self-inductance with said primary oscillation circuit.

In order to excite the tube for the production of oscillations it is necessary that between cathode and anode or auxiliary electrode a periodic potential difference be produced in the rhythm in which the oscillations are maintained. The rhythm itself is determined by the electric value of the circuits between the cathode and anode and between the cathode and grid. To produce this necessary potential a self-inductance is inserted between the cathode and one of the other electrodes, the energy produced being taken from the cathode and from the electrode which is still free.

The arrangement can be used not only for the transmission of energy but also as a receiver, in which case relay-action occurs in the well-known manner.

Figures 1 and 2 of the accompanying drawing show by way of example two connections for the execution of the method of my present invention.

In the connection shown by Fig. 1, the cathode $k$ and the anode $a$ are coupled with the oscillation primary system (antenna), the cathode $k$ and the anode $a$ being connected with the antenna self-inductance $s_1$ across the high tension battery $h$ provided with a shunting condenser. The primary oscillation system is completed by the tuning condenser $c$. A self-inductance is inserted between cathode and grid whereby the grid $g$ obtains a potential difference with regard to $k$.

In this connection the self-inductance which is inserted in the primary circuit (antenna) forms, therefore, a part of the same.

According to Fig. 2 the connection can be arranged so that grid $g$ and cathode $k$ are coupled with the oscillating primary system $s_a$ $c$ by a self-inductance $s_1$, whilst the anode is connected with the cathode by the coil $s_2$ in series with the battery $h$.

The value of the self-inductance $s_2$ which does not form part of the oscillation system depends within certain limits on the wave length but it is not critical. Under certain conditions the value of self-induction resulting from the connecting conduits between the electrodes will be sufficient.

The current in the oscillating circuit is maintained thereby and the losses from radiation and damping are made up by a supplementary current generated in the tube circuits. It is necessary for the current to bear a proper phase relationship in the tube circuits, otherwise, instead of adding new energy to the circuit, energy is detracted. The existence of currents in the tube circuits is solely conditioned by the difference of potential between grid $g$ and the electrode $k$ in the form of the filament, whereby the latter must have negative potential. If this is not the case, no current is possible. If, therefore, the difference of potential between grid $g$ and $k$ can be changed at the proper moment, so that the tube current furnishes only addition to the oscillation energy, a continuing oscillation will take place. For this purpose the coil $s_2$ located between grid and the cathode, serves as a controlling means which operates as follows:—

The addition to the tube oscillating current is furnished only during a short portion of time of each half cycle as it takes a certain time for the self-inductance $s_2$ to assume its maximum current and to produce sufficient phase lag of the grid potential. Thus the oscillation maintaining potential is set up in the form of impulses during each half cycle which is in contra-distinction to the well known reaction method above referred to whereby a steady coupling between the oscillatory circuit and the control circuit is present. The present system has the advantage that a more effective control of the oscillations in the oscillatory circuit may be carried out whereby the efficiency of the oscillating system is increased.

What I claim and desire to secure by Letters Patent of the United States is as follows:

1. In a system for the generation of rapid electrical oscillations by means of a vacuum tube comprising an incandescent cathode, an anode and a grid element, an output oscillatory circuit connected between said cathode and anode, adapted to produce initial free oscillations, means for controlling and sustaining said oscillations in said output circuit consisting of substantially pure self-inductance connected between said cathode and grid without any further coupling connection with said first mentioned oscillatory circuit.

2. In an arrangement for the generation of rapid electrical oscillations by means of a vacuum tube having an incandescent cathode, an anode and a grid element, an output oscillatory circuit connected between said cathode and anode electrodes adapted to produce initial free electric oscillations, an oscillation self-controlling and sustaining means consisting of a substantially pure self-inductance connected between said cathode and grid element and having no connection with said output circuit except across the grid and anode of the tube.

3. In a system for producing oscillation of carrier frequency, a vacuum tube, an output circuit and control circuit therefor said control circuit consisting of a substantially pure self inductance having no external connection with said output circuit.

4. In a system for producing oscillations of carrier frequency, a three element tube comprising an output circuit and an input circuit, said input circuit consisting of a pure self-inductance being outside of said tube electrically disconnected from said output circuit and serving as control element of the oscillations in said output circuit.

5. In a system for producing oscillations of carrier frequency, a three element tube comprising an output circuit and an input circuit, said input circuit being electrically disconnected from said output circuit outside of said tube and means consisting of substantially pure self inductance including said input circuit for controlling oscillations in said output circuit.

6. In a system for producing oscillations of carrier frequency, a three element tube, an output circuit therefor, an input circuit electrically disconnected from said output circuit outside of said tube whereby no coupling exist therebetween and means consisting of substantially pure self inductance including said input circuit for maintaining oscillations in said output circuit.

7. In a system for producing oscillations, a three element tube, an output circuit therefor, an input circuit electrically disconnected from said output circuit outside of said tube whereby no coupling exist therebetween and means consisting of substantially pure self inductance including said input circuit for maintaining said oscillation in said output circuit, the electrical condition of said input circuit being electrically controlled by the electrical condition of said output circuit.

8. In an electrical circuit for producing oscillations, a three element tube, an input therefor comprising a substantially pure self inductance, an output circuit therefor comprising self inductance, said inductances being electrically and magnetically separated to prevent coupling therebetween the electrical condition of said input inductance being controlled by the oscillations in said output inductance.

9. In an electrical circuit for producing oscillations, a three element tube, an input therefor comprising a substantially pure self inductance, an output therefor comprising a self inductance, said inductances being electrically isolated to prevent coupling therebetween, the electrical condition of said input inductance being controlled by the oscillations in said output inductance for maintaining said oscillations in said output inductance.

WILHELM SCHEPPMANN.